United States Patent
Shi et al.

(10) Patent No.: US 9,931,792 B2
(45) Date of Patent: Apr. 3, 2018

(54) POWDER RECYCLING MACHINE

(71) Applicant: MICROJET TECHNOLOGY CO., LTD, Hsinchu (TW)

(72) Inventors: Kwo-Yuan Shi, Hsinchu (TW); Chih-Kai Chen, Hsinchu (TW); Chi-Feng Huang, Hsinchu (TW)

(73) Assignee: Microjet Technology Co., Ltd., Hsinchu (TW)

( * ) Notice: Subject to any disclaimer, the term of this patent is extended or adjusted under 35 U.S.C. 154(b) by 285 days.

(21) Appl. No.: 15/049,799

(22) Filed: Feb. 22, 2016

(65) Prior Publication Data
US 2016/0271887 A1    Sep. 22, 2016

(30) Foreign Application Priority Data
Mar. 16, 2015    (TW) .............................. 104108381 A

(51) Int. Cl.
*B01D 45/12*    (2006.01)
*B29C 67/00*    (2017.01)
(Continued)

(52) U.S. Cl.
CPC .......... *B29C 67/0096* (2013.01); *B01D 45/12* (2013.01); *A47L 9/1625* (2013.01);
(Continued)

(58) Field of Classification Search
CPC .......... B29K 2105/26; B29K 2105/251; B33Y 40/00; B33Y 10/00; B07B 4/00;
(Continued)

(56) References Cited

U.S. PATENT DOCUMENTS

2003/0131571 A1*  7/2003  Demarco .............. B01D 45/16
                                                                55/324
2007/0234906 A1* 10/2007  DeMarco .............. B01D 45/12
                                                                96/382
(Continued)

FOREIGN PATENT DOCUMENTS

TW    201217071 A    5/2012
TW    201330941 A    8/2013

*Primary Examiner* — Dung H Bui
(74) *Attorney, Agent, or Firm* — Kirton McConkie; Evan R. Witt

(57) ABSTRACT

A powder recycling machine includes a casing, a powder collector, a dust-sucking system and a dust-removing system. An accommodation space within the casing is divided into a first space and a second space by a partition plate. The powder collector is disposed within the first space for collecting excess powder from the first space. The dust-sucking system includes a connector, a cyclone separator and a first suction device. The connector, the cyclone separator, the first suction device and the powder collector are sequentially in communication with each other through plural transmission ducts. The dust-removing system includes a second suction device. The first space, the second suction device and the powder collector are sequentially in communication with each other through plural guiding ducts. After the excess powder suspended in the first space is introduced into the dust-removing system, the excess powder is transferred to the powder collector.

6 Claims, 2 Drawing Sheets

(51) Int. Cl.
  *B33Y 40/00* (2015.01)
  *B29K 105/00* (2006.01)
  *B29K 105/26* (2006.01)
  *B03C 3/017* (2006.01)
  *B07B 9/02* (2006.01)
  *A47L 9/16* (2006.01)
  *B07B 4/00* (2006.01)

(52) U.S. Cl.
  CPC .............. *B03C 3/017* (2013.01); *B07B 4/00* (2013.01); *B07B 9/02* (2013.01); *B29C 67/0077* (2013.01); *B29K 2105/251* (2013.01); *B29K 2105/26* (2013.01); *B33Y 40/00* (2014.12)

(58) Field of Classification Search
  CPC ......... B07B 9/02; B03C 3/017; A47L 9/1625; A47L 9/1641; A47L 9/1683; Y10S 55/03; B01D 45/12
  See application file for complete search history.

(56) References Cited

U.S. PATENT DOCUMENTS

| | | | |
|---|---|---|---|
| 2008/0116118 A1* | 5/2008 | Zhu | B01F 3/1221 209/142 |
| 2008/0230446 A1* | 9/2008 | Bertram | A47L 9/102 209/10 |
| 2014/0216333 A1* | 8/2014 | Hoversten | B04C 5/08 118/308 |
| 2015/0298397 A1* | 10/2015 | Chen | B07B 4/00 209/12.2 |
| 2016/0200053 A1* | 7/2016 | Chen | B29C 67/0096 425/217 |

* cited by examiner

POWDER RECYCLING MACHINE

FIELD OF THE INVENTION

The present invention relates to a powder recycling machine, and more particularly to a powder recycling machine for a three-dimensional rapid prototyping apparatus.

BACKGROUND OF THE INVENTION

As known, a rapid prototyping (RP) technology is developed from the concepts of forming a pyramid by stacking layers, and the main technical feature is to achieve fast formation. A complicated design can be transformed into a three-dimensional physical model automatically and fast without any cutting tools, molds and fixtures. Thus, the development cycle of new products and research and development cost are largely reduced to ensure the time to market for new products and the first-time-right ratio. Accordingly, a complete and convenient product design tool is provided between technicians and non-technicians (e.g. managers and users), and the product competitiveness and the quick reaction capability of enterprises in the market are improved obviously.

Recently, the rapid prototyping technology develops a method for producing three-dimensional physical models by combining jet printing and precise positioning of carriers. The producing method begins by first spreading a layer of powder on the carrier and then printing high viscosity liquid binder on part of the powder by using jet printing technology, so that the liquid binder and the powder stick together to become solidified. After the above steps are repeatedly done, a three-dimensional physical model is produced by stacking multiple layers.

Since the processes of spreading powder, printing and taking out the finished product are manually performed according to the conventional rapid prototyping technology, the flying dust usually pollutes the working environment and contaminates the whole three-dimensional rapid prototyping apparatus. For maintaining normal operation, a dust-sucking and cleaning task is manually done after a specified stage of the rapid prototyping technology. Consequently, the conventional rapid prototyping technology is labor-intensive. Moreover, if the worker is exposed to the flying dust for a long time, the flying dust is harmful to the health of the worker. Moreover, the conventional dust-sucking task cannot provide sufficient sucking strength to clean the three-dimensional rapid prototyping apparatus. In other words, the working environment cannot be effectively and quickly cleaned.

Conventionally, for improving the cleanliness of the working environment of the three-dimensional rapid prototyping apparatus, a post-processing machine is provided. The operations of the post-processing machine will be illustrated as follows. Firstly, the three-dimensional object is placed within the post-processing machine. Then, a strong airflow is provided to inject the three-dimensional object in order to remove the excess powder from the three-dimensional object. However, while the surface of the three-dimensional object is ejected by the strong airflow, the powder containing the liquid binder and the recyclable powder are mixed. Under this circumstance, the collected excess powder cannot be recycled and reused. Moreover, the conventional powder recycling machine is only able to remove the excess powder from the surface of the three-dimensional surface. That is, the conventional post-processing machine cannot provide expanded functions such as the function of cleaning the three-dimensional rapid prototyping apparatus or the function of filtering and recycling the excess powder. Consequently, the applications of the post-processing machine are limited, and the post-processing machine is not cost-effective.

Therefore, there is a need of providing a powder recycling machine in order to overcome the above drawbacks.

SUMMARY OF THE INVENTION

The present invention provides a powder recycling machine with a cyclone separator for providing a rotating gaseous stream. Consequently, the performance of sucking the excess powder is enhanced.

The present invention provides a powder recycling machine with a dust-sucking system and a dust-removing system. The dust-sucking system is used for removing excess construction powder from a three-dimensional rapid prototyping apparatus. The dust-removing system is used for recycling the excess powder within the powder recycling machine. Consequently, the cleanliness of the working environment is enhanced, and the powder recycling efficiency is increased.

In accordance with an aspect of the present invention, there is provided a powder recycling machine. The powder recycling machine includes a casing, a powder collector, a dust-sucking system and a dust-removing system. The casing has a partition plate therein. An accommodation space within the casing is divided into a first space and a second space by the partition plate. The powder collector is disposed within the first space for collecting excess powder from the first space. The dust-sucking system is disposed within the second space, and includes a connector, a cyclone separator, a first suction device and plural transmission ducts. The connector, the cyclone separator, the first suction device and the powder collector are sequentially in communication with each other through the plural transmission ducts. The connector is partially exposed outside the casing and connected with an external dust-sucking pipe. The dust-removing system is disposed within the second space, and includes a second suction device and plural guiding ducts. The first space, the second suction device and the powder collector are sequentially in communication with each other through the plural guiding ducts, so that the excess powder suspended in the first space is introduced into the dust-removing system and the excess powder is sequentially transferred to the second suction device and the powder collector so as to remove dust in the first space.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
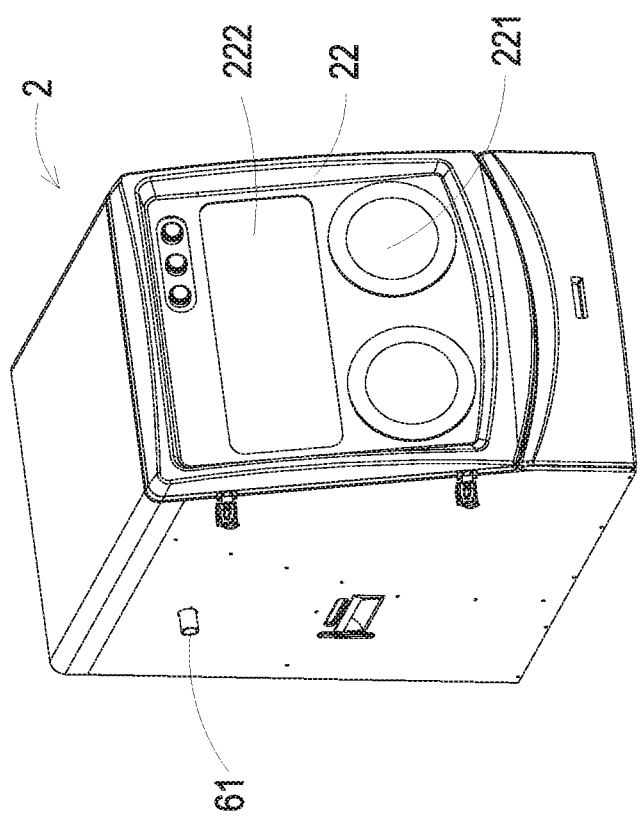
FIG. 1 is a schematic perspective view illustrating a powder recycling machine according to an embodiment of the present invention.
Figure 2:
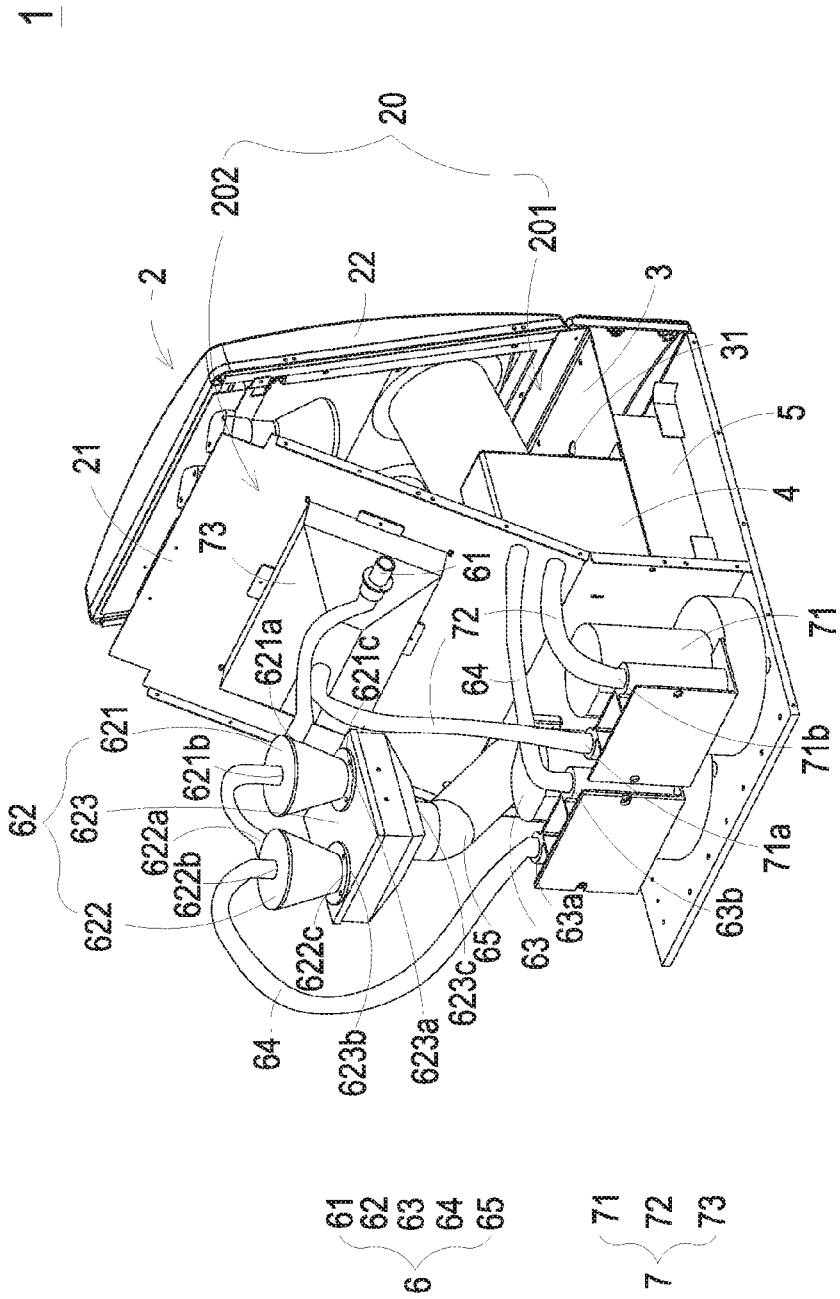
FIG. 2 is a schematic perspective view illustrating the internal structure of the powder recycling machine of FIG. 1.

FIG. 1 is a schematic perspective view illustrating a powder recycling machine according to an embodiment of the present invention. FIG. 2 is a schematic perspective view illustrating the internal structure of the powder recycling machine of FIG. 1.

The powder recycling machine 1 is applied to a three-dimensional rapid prototyping apparatus. After a three-dimensional object (i.e., a three-dimensional physical model) is produced by the three-dimensional rapid prototyping apparatus, the three-dimensional object is transferred to the inner portion of the powder recycling machine 1. Consequently, the excess power adsorbed on the surface of the three-dimensional object is sucked and filtered by the powder recycling machine 1. After the excess powder is sieved and collected, the excess powder can be recycled and reused.

As shown in FIGS. 1 and 2, the powder recycling machine 1 at least comprises a casing 2, a powder collector 4, a dust-sucking system 6 and a dust-removing system 7. An accommodation space 20 within the casing 2 is divided into a first space 201 and a second space 202 by a partition plate 21. When the three-dimensional object is placed within the first space 201, the excess powder can be removed from the surface of the three-dimensional object.

The powder collector 4 is disposed within the first space 201 in order to collect the excess powder from the dust-sucking system 6 and the dust-removing system 7.

The dust-sucking system 6 is disposed within the second space 201. In this embodiment, the dust-sucking system 6 comprises a connector 61, a cyclone separator 62, a first suction device 63 and plural transmission ducts 64. The connector 61, the cyclone separator 62, the first suction device 63 and the powder collector 4 are sequentially in communication with each other through the plural transmission ducts 64. The connector 61 is partially exposed outside the casing 2. Moreover, a first end of a dust-sucking pipe (not shown) is coupled with the connector 61, and a second end of the dust-sucking pipe is located near the three-dimensional rapid prototyping apparatus for inhaling the excess construction powder from the three-dimensional rapid prototyping apparatus. After the excess construction powder is inhaled to the dust-sucking system 6 through the dust-sucking pipe, the excess construction powder is guided to the powder collector 4. Consequently, the dust-sucking task of the three-dimensional rapid prototyping apparatus is performed. In some embodiments, the dust-sucking pipe can be used for performing a strong dust-sucking task.

The dust-removing system 7 is also disposed within the second space 202. The dust-removing system 7 comprises a second suction device 71 and plural guiding ducts 72. An end of the guiding duct 72 is in communication with the first space 201. Moreover, the first space 201, the second suction device 71 and the powder collector 4 are sequentially in communication with each other through the plural guiding ducts 72. After the excess powder suspended in the first space 201 is introduced into the dust-removing system 7, the excess powder is collected by the powder collector 4. Consequently, a dust-removing task of removing the flying powder from the first space 201 can be performed.

Please refer to FIG. 1 again. The casing 2 further comprises a door plate 22. When the door plate 22 is opened, the three-dimensional object can be placed within the first space 201. Moreover, the door plate 22 is equipped with plural openings 221 and a window 222. Each opening 221 is connected with a corresponding isolation element (not shown). Consequently, the accommodation space 20 within the casing 2 is a sealed space that is isolated from the surroundings. In an embodiment, the isolation element is a working glove. After the both hands of a worker insert into the working gloves, an excess powder removing task can be manually done. That is, the both hands of the worker can insert into the first space 201 through the working gloves in order to manually remove the excess powder from the surface of the three-dimensional object. Since the excess powder removing process is performed under a completely sealed condition, the working environment will not be polluted by the flying dust of the excess powder. Moreover, the window 222 of the door plate 22 is a transparent plate. Consequently, the worker can realize the operating condition of the powder recycling machine 1 through the window 222.

Please refer to FIG. 2 again. The powder recycling machine 1 further comprises a processing platform 3 and a recycling tank 5. The processing platform 3 and the recycling tank 5 are both disposed within the first space 201. In this embodiment, the processing platform 3 is located near a bottom of the casing 2. The three-dimensional object is disposed over the processing platform 3. The recycling tank 5 is disposed under the processing platform 3. The processing platform 3 comprises a screen mesh 31. The three-dimensional object is supported on the screen mesh 31. After the excess powder is removed from the surface of the three-dimensional object and falls down to the processing platform 3, the excess powder is sieved by the screen mesh 31 to filter off the large-sized powder or dust. The powder passing through the screen mesh 31 falls down to the recycling tank 5. Consequently, the excess powder can be recycled and reused. On the other hand, the powder collector 4 is disposed over the processing platform 3, and in communication with the processing platform 3 and the underlying recycling tank 5. After the excess power from the dust-sucking system 6 and the dust-removing system 7 is collected by the powder collector 4, the excess powder is transferred to the recycling tank 5 so as to be recycled.

The operations and structures of the dust-sucking system 6 will be illustrated in more details as follows. After a prototyping task of the three-dimensional rapid prototyping apparatus is completed, the connector 61 is connected with the dust-sucking pipe. Consequently, the excess construction powder remained in a construction platform (not shown) of the three-dimensional rapid prototyping apparatus can be inhaled into the powder recycling machine 1. As mentioned above, the dust-sucking system 6 comprises the connector 61, the cyclone separator 62, the first suction device 63 and the plural transmission ducts 64. The first suction device 63 is used for providing negative pressure airflow. That is, the dust-sucking system 6 is a negative pressure system. Consequently, the excess construction powder from the construction platform of the three-dimensional rapid prototyping apparatus can be inhaled into the dust-sucking system 6. The inhaled excess powder is transferred to the powder collector 4 through the plural transmission ducts 64, the connector 61, the cyclone separator 62 and the first suction device 63 sequentially.

Please refer to FIG. 2 again. In this embodiment, the cyclone separator 62 comprises a first cyclone unit 621 and a second cyclone unit 622. That is, the two cyclone units can provide strong suction force. It is noted that the number of the cyclone units may be altered according to the practical requirements. The first cyclone unit 621 has a first cyclone inlet 621a and a first cyclone outlet 621b. The second cyclone unit 622 has a second cyclone inlet 622a and a second cyclone outlet 622b. The first cyclone inlet 621a is formed in a sidewall of the first cyclone unit 621. The second cyclone inlet 622a is formed in a sidewall of the second cyclone unit 622. The first cyclone outlet 621b is located at a top side of the first cyclone unit 621. The second cyclone outlet 622b is located at a top side of the second cyclone unit 622. The first cyclone inlet 621a of the first cyclone unit 621 is in communication with the connector 61 through the corresponding transmission duct 64. The first cyclone outlet 621b of the first cyclone unit 621 is in communication with the second cyclone inlet 622a of the second cyclone unit 622 through the corresponding transmission duct 64. The second cyclone outlet 622b of the second cyclone unit 622 is in communication with the first suction device 63 through the corresponding transmission duct 64. Since the components of the dust-sucking system 6 are in communication with each other through the plural transmission ducts 64, the dust-sucking system 6 is a close dust-removing loop.

Moreover, the first cyclone unit 621 and the second cyclone unit 622 are cone-shaped cylinders. The area of the upper portion of the first cyclone unit 621 is larger than the area of the lower portion of the first cyclone unit 621. The area of the upper portion of the second cyclone unit 622 is larger than the area of the lower portion of the second cyclone unit 622. When the negative pressure is applied to the second cyclone outlet 622b of the second cyclone unit 622 by the first suction device 63, the air of the second cyclone unit 622 is extracted, so that a rotating gaseous stream is generated within the second cyclone unit 622. Since the second cyclone inlet 622a of the second cyclone unit 622 is in communication with the first cyclone outlet 621b of the first cyclone unit 621 through the corresponding transmission duct 64, the air of the first cyclone unit 621 is also extracted and a rotating gaseous stream is also generated within the first cyclone unit 621. As mentioned above, the rotating gaseous streams are generated within the first cyclone unit 621 and the second cyclone unit 622 in response to the negative pressure airflow in the dust-sucking system 6. Due to the rotating gaseous streams, the excess construction powder from the construction platform of the three-dimensional rapid prototyping apparatus can be inhaled into the dust-sucking system 6 through the dust-sucking pipe. The inhaled excess construction powder is sequentially introduced into the first cyclone unit 621 and the second cyclone unit 622 through the corresponding transmission duct 64. In particular, the large-size powdery particles fall down because of gravity, and the small-size powdery particles are guided to the first suction device 63 through the corresponding transmission duct 64.

Since the dust-sucking system 6 has two cyclone units to generate the rotating gaseous streams, the dust-sucking capability of the dust-sucking system 6 is stronger than the conventional dust sucking device. In particular, since the dust-sucking efficacy of the dust-sucking system 6 reaches the industrial level, the performance of the dust-sucking system 6 to achieve the cleanliness is enhanced. Consequently, the dust-sucking system 6 can quickly remove the excess construction powder from the construction platform of the three-dimensional rapid prototyping apparatus.

The cyclone separator 62 further comprises a collecting tank 623. The collecting tank 623 is disposed under the first cyclone unit 621 and the second cyclone unit 622. The collecting tank 623 comprises a first inlet 623a, a second inlet 623b and a powder-falling port 623c. A powder outlet 621c is located at a bottom of the first cyclone unit 621. A powder outlet 622c is located at a bottom of the second cyclone unit 622. The powder outlet 621c is in communication with the first inlet 623a of the collecting tank 623. The powder outlet 622c is in communication with the second inlet 623b of the collecting tank 623. After the excess construction powder is sequentially introduced into the first cyclone unit 621 and the second cyclone unit 622, the large-size powdery particles fall down to the collecting tank 623 through the powder outlets 621c and 622c because of gravity. The large-size powdery particles are transferred to the powder collector 4 through a bypass duct 65. Since the rotating gaseous streams are generated within the first cyclone unit 621 and the second cyclone unit 622, the small-size powdery particles are guided to the first suction device 63 through the corresponding transmission duct 64.

Please refer to FIG. 2 again. The first suction device 63 is a negative pressure regulator. The first suction device 63 has a suction inlet 63a and a suction outlet 63b. The suction inlet 63a is in communication with the second cyclone outlet 622b of the second cyclone unit 622 through the corresponding transmission duct 64. The suction outlet 63b is in communication with the powder collector 4 through the corresponding transmission duct 64. In this embodiment, the first suction device 63 is a power source for driving the airflow in the dust-sucking system 6. While the airflow is inhaled through the suction inlet 63a and exhausted through the suction outlet 63b, the dust-sucking system 6 is operated in a negative pressure driving mode. Moreover, since the rotating gaseous streams are generated within the first cyclone unit 621 and the second cyclone unit 622 of the cyclone separator 62, the excess construction powder from the construction platform of the three-dimensional rapid prototyping apparatus can be inhaled into the dust-sucking system 6 through the dust-sucking pipe which is connected with the connector 61. The small-size powdery particles of the excess construction power are transferred to the power collector 64 through the cyclone separator 62 and the first suction device sequentially. Meanwhile, the dust-sucking task of the three-dimensional rapid prototyping apparatus is completed. Under this circumstance, the cleanliness of the construction platform of the three-dimensional rapid prototyping apparatus is enhanced, and the excess construction power is recycled.

During the process of removing the excess power from the surface of the three-dimensional object in the first space 201, a portion of the excess powder is possibly suspended in the first space 201. The dust-removing system 7 is disposed within the second space 202. After the excess powder suspended in the first space 201 is introduced into the dust-removing system 7, the excess powder is collected by the powder collector 4. Consequently, a dust-removing task of removing the flying powder from the first space 201 can be performed.

Please refer to FIG. 2 again. The dust-removing system 7 comprises a filtering device 73, the second suction device 71 and the plural guiding ducts 72. The filtering device 73 is installed on the partition plate 21. Moreover, the filtering device 73 is in communication with the first space 201 and the corresponding guiding duct 72. A filter medium (not shown) is disposed within the filtering device 73 for filtering the excess powder that is suspended in the first space 201. The excess powder passing through the filter medium is transferred to the second suction device 71 through the corresponding guiding duct 72.

In this embodiment, the second suction device 71 is a power source for driving the airflow in the dust-removing system 7. The second suction device 71 has a suction inlet 71a and a suction outlet 71b. The suction inlet 71a is in communication with the filtering device 73 through the corresponding guiding duct 72. The suction outlet 71b is in communication with the powder collector 4. While the airflow is inhaled through the suction inlet 71a and exhausted through the suction outlet 71b, the dust-removing system 7 is operated in a negative pressure driving mode. Consequently, a suction force is applied to the first space 201 that is in communication with the dust-removing system 7. In response to the suction force, the excess powder suspended in the first space 201 is inhaled into the dust-removing system 7. After the excess powder is filtered by the filtering device 73, the excess powder passing through the filtering device 73 is transferred to the second suction device 71 through the corresponding guiding duct 72. After the excess powder is transferred to the powder collector 4 through the corresponding guiding duct 72, the dust-removing task of recycling the excess powder from the first space 201 is completed. Since the dust-removing task can prevent the flying dust of the excess powder in the first space 201, the cleanliness of the first space 201 is enhanced and the excess powder is recycled.

Due to the arrangement of the dust-sucking system 6 and the dust-removing system 7, the powder recycling machine 1 can remove the excess powder from the surface of the three-dimensional object. Moreover, the flying dust outside the powder recycling machine 1 and the flying dust inside the powder recycling machine 1 can be effectively sucked, filtered and recycled. Consequently, the powder recycling machine 1 is more cost-effective.

From the above descriptions, the present invention provides a powder recycling machine. The powder recycling machine has a cyclone separator for providing a rotating gaseous stream. Consequently, the performance of sucking the excess powder is enhanced. The powder recycling machine further comprises a dust-sucking system and a dust-removing system. The dust-sucking system is used for removing excess construction powder from a three-dimensional rapid prototyping apparatus. The dust-removing system is used for recycling the excess powder within the powder recycling machine. Consequently, the cleanliness of the working environment is enhanced, and the powder recycling efficiency is increased. In other words, the powder recycling machine is capable of cleaning the three-dimensional object, sucking the outside flying dust, sucking the inside flying dust and filtering the excess powder. Because of the multiple functions, the powder recycling machine of the present invention is industrially applicable.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A powder recycling machine, comprising:
    a casing having a partition plate therein, wherein an accommodation space within the casing is divided into a first space and a second space by the partition plate;
    a powder collector disposed within the first space for collecting excess powder from the first space;
    a dust-sucking system disposed within the second space, and comprising a connector, a cyclone separator, a first suction device and plural transmission ducts, wherein the connector, the cyclone separator, the first suction device and the powder collector are sequentially in communication with each other through the plural transmission ducts, wherein the connector is partially exposed outside the casing and connected with an external dust-sucking pipe, wherein the cyclone separator comprises a first cyclone unit, a second cyclone unit and a collecting tank, the first cyclone unit comprises a first powder outlet, a first cyclone inlet and a first cyclone outlet, and the second cyclone unit comprises a second powder outlet, a second cyclone inlet and a second cyclone outlet, wherein the first cyclone inlet is in communication with the connector, the first cyclone outlet is in communication with the second cyclone inlet, and the second cyclone outlet is in communication with the first suction device, and the collecting tank comprises a first inlet, a second inlet and a powder-falling port, wherein the first inlet of the collecting tank is in communication with the first powder outlet, the second inlet of the collecting tank is in communication with the second powder outlet, and the powder-falling port is in communication with the powder collector through a bypass duct;
    a processing platform disposed within the first space, and comprising a screen mesh and a recycling tank, wherein the recycling tank is disposed under the processing platform and in communication with the powder collector, wherein the excess powder passing through the screen mesh and the excess powder in the powder collector are further transferred to the recycling tank, wherein after the excess powder is removed from the first space, the excess powder is sieved by the screen mesh; and
    a dust-removing system disposed within the second space, and comprising a second suction device and plural guiding ducts, wherein the first space, the second suction device and the powder collector are sequentially in communication with each other through the plural guiding ducts, wherein after the excess powder suspended in the first space is introduced into the dust-removing system, the excess powder is transferred to the powder collector.

2. The powder recycling machine according to claim 1, wherein the first suction device has a suction inlet and a suction outlet, wherein the suction inlet is in communication with the cyclone separator, and the suction outlet is in communication with the powder collector.

3. The powder recycling machine according to claim 1, wherein the first suction device provides negative pressure airflow, and the negative pressure airflow is transferred through the transmission ducts, so that a rotating gaseous stream is generated in the cyclone separator, wherein in response to the rotating gaseous stream, excess construction powder from a three-dimensional rapid prototyping apparatus is inhaled into the dust-sucking system through the dust-sucking pipe and guided to the powder collector.

4. The powder recycling machine according to claim 1, wherein the dust-removing system further comprises a filtering device, wherein the filtering device is installed on the partition plate, and the filtering device is in communication with the first space and the corresponding guiding duct, wherein after the excess powder in the first space is filtered by the filtering device, the excess powder passing through the filtering device is transferred to the powder collector.

5. The powder recycling machine according to claim 4, wherein the second suction device has a suction inlet and a suction outlet, wherein the suction inlet is in communication with the filtering device through the corresponding guiding duct, and the suction outlet is in communication with the powder collector.

6. The powder recycling machine according to claim 4, wherein the second suction device provides negative pressure airflow, wherein in response to the negative pressure airflow, the excess powder suspended in the first space is inhaled into the dust-removing system in response to the negative pressure airflow, and the excess powder passing through the filtering device is transferred to the powder collector.

* * * * *